(No Model.)
R. H. SMITH.
MEANS FOR GAS DISTRIBUTION.
No. 330,267. Patented Nov. 10, 1885.
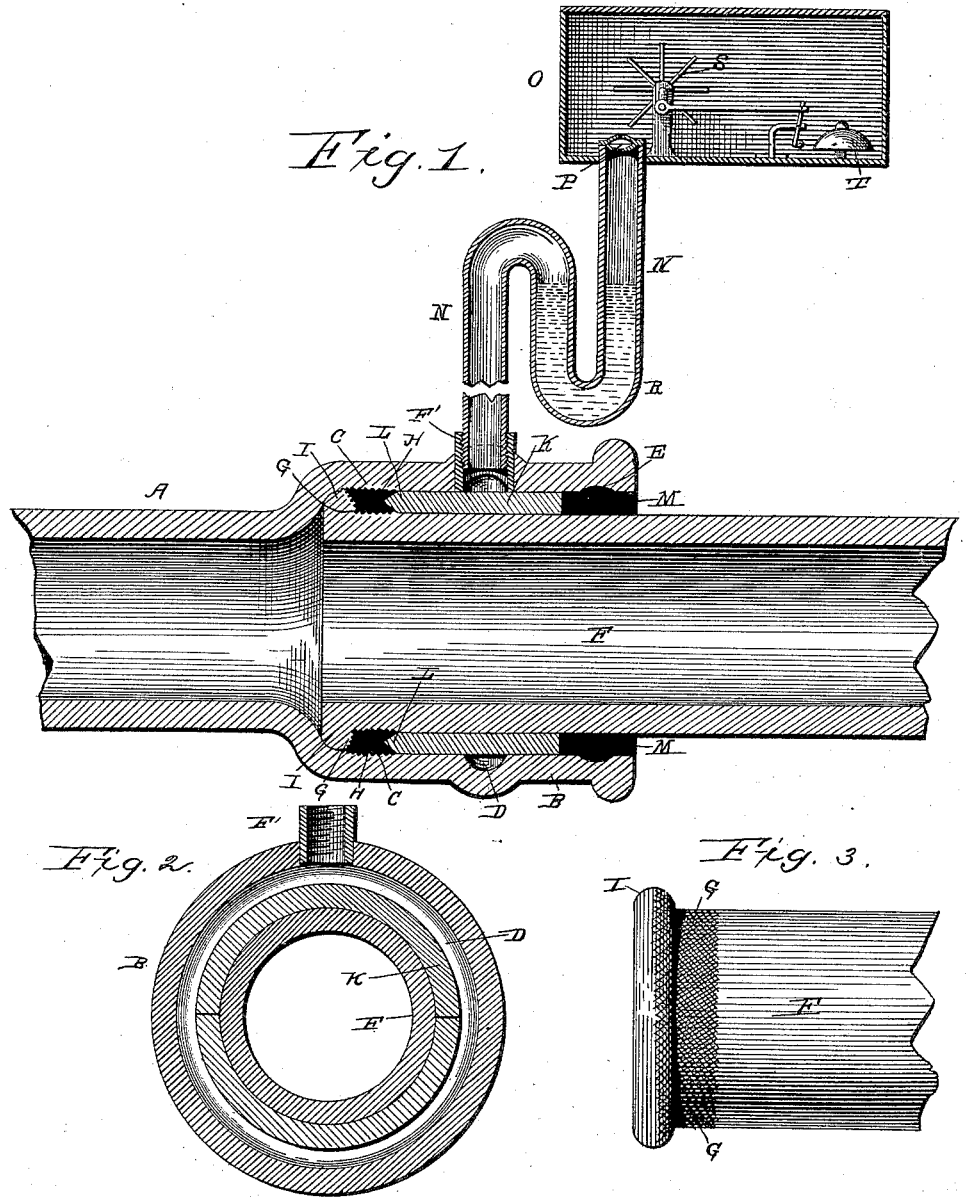
WITNESSES
Chas. D. Davis
F. S. Chapman
INVENTOR
R. H. Smith
By R. H. Alexander
Attorney

UNITED STATES PATENT OFFICE.

ROLAND H. SMITH, OF PITTSBURG, PENNSYLVANIA.

MEANS FOR GAS-DISTRIBUTION.

SPECIFICATION forming part of Letters Patent No. 330,267, dated November 10, 1885.

Application filed September 17, 1885. Serial No. 177,333. (No model.)

*To all whom it may concern:*

Be it known that I, ROLAND H. SMITH, a citizen of the United States, residing at Pittsburg, in the county of Allegheny and State of Pennsylvania, have invented certain new and useful Improvements in Means for Gas-Distribution, of which the following is a specification, reference being had therein to the accompanying drawings.

My invention relates to improvements in means for gas-distribution, and is designed to produce a device for preventing the leakage of gas under pressure from the joints of the main, and also to produce an alarm for indicating leakage from defective work or other cause.

In the drawings, Figure 1 represents a vertical section of the pipe and alarm; Fig. 2, a cross-section of the pipe at the joint, and Fig. 3 a detail of the spigot end of the pipe.

The pipe A has its bowl end B provided at the base with a roughened, fluted, or corrugated surface, C. About midway of the interior of the bowl is an annular groove, D, and near the open end an annular recess, E.

A short pipe, F′, with an interior screw-thread, is cast in one side of the bowl, so as to open into the groove D, thus saving the expense of tapping the said pipe into the side of the said bowl. The spigot end of the pipe F is roughened, fluted, or corrugated, as shown at G. The spigot end of the pipe is inserted till it reaches the end of the bowl, as shown in Fig. 1. A gasket, H, of sealing material—such as lead—surrounding the said pipe F, is forced into the said bowl till it reaches the flange I on the spigot end of said pipe and contacts with the corrugated surfaces. Then a ring or filling, preferably of iron, and shown at K, surrounding the pipe F, and having one edge or end triangular or wedge shape in cross-section, as shown at L, is passed into the bowl, the edge L entering the gasket H and spreading the material thereof, forcing it into the corrugations, thus forming a tight joint. The ring K is of such width as to reach about an equal distance on each side of the groove D. The remaining portion of the bowl is filled by the gasket M, the material of which is forced into the recess E.

The gaskets and ring may each be made of one piece and then split at some point, so that they may easily be spread sufficiently to be placed on the pipe F, or they may each be made of two pieces.

Under ordinary circumstances the joint will resist a very high gas-pressure; but to insure absolute safety and detect leaks that may occur from defective work or accidents, the pipe F′ is connected with a pipe, N, which enters a box, O, placed at or near the surface of the ground. The top of the said pipe is closed by a whistle, P, and at some point near said end the said pipe is provided with a trap, R, filled with water normally. Within the box is placed a wheel, S, formed of radiating wings, and so situated that were the contents of the pipe N ejected the said wheel would be caused to revolve. The axle of the wheel is connected with the hammer of the bell T, so that should the wheel revolve the bell will be rung.

Any gas-leakage will pass through the space occupied by the gasket H and the ring K and collect in the groove D. From thence it will pass through the pipe N. If the water be dispensed with, or for any reason should not be contained in the pipe, the escaping gas will operate the whistle to give an alarm. With the water in the pipe the gas will force the same against the wings of the wheel S, causing the said wheel to revolve and operate the bell. Thus in either case an alarm will be given and the position or location of the leak easily ascertained.

The gaskets may be cut from lead piping or cast in the required shape. They are used in the cold state, and, on account of the ductility of the metal used, are easily forced into the corrugations and recesses.

The ring K may be formed of other substances than iron—such as wood, for instance—and may be constructed in two or more pieces or sections.

I claim—

1. A spigot-joint having the bowl provided with packing-gaskets at its base and mouth, and the intermediate space occupied by a filling with unbroken contact-surfaces and solid in cross-section, substantially as specified.

2. A spigot-joint having the bowl provided with a packing-gasket at its base and at its mouth, and an intermediate filling completely occupying the intervening space between the gaskets, said filling being solid in cross-section and having a wedge-shaped edge, substantially as specified.

3. A spigot-joint having the bowl provided with an interior groove, and a pipe cast in said bowl and communicating with said groove, substantially as and for the purpose specified.

4. A spigot-joint having the bowl and spigot end corrugated, also having the bowl provided with an interior annular groove, and a pipe leading from said groove and cast in said bowl, gaskets contained within said bowl, and an intermediate filling with one end or edge wedge shape, substantially as and for the purpose specified.

5. A spigot-joint having a bowl provided with an interior annular groove, and a pipe cast therein and connected with said groove, and a trap-pipe leading to an alarm mechanism, substantially as and for the purpose specified.

6. A pipe-joint having the interior thereof connected to an audible alarm, substantially as and for the purpose specified.

7. A pipe-joint having a bowl with an interior annular groove, and a pipe leading therefrom to an alarm, substantially as and for the purpose specified.

In testimony whereof I affix my signature in presence of two witnesses.

ROLAND H. SMITH.

Witnesses:
D. P. BLACK,
MILTON I. BAIRD.